United States Patent
Gustafsson et al.

(10) Patent No.: US 8,034,246 B2
(45) Date of Patent: Oct. 11, 2011

(54) WASTEWATER MERCURY REMOVAL PROCESS

(75) Inventors: Meredith B. Gustafsson, Beaumont, TX (US); Bal K. Kaul, Fairfax, VA (US); Brian S. Fox, Mullica Hill, NJ (US); David A. Masciola, Alexandria, VA (US); Bowornsak Wanichkul, Bangkok (TH)

(73) Assignee: ExxonMobil Research & Engineering Company, Annandale, NJ (US)

( * ) Notice: Subject to any disclaimer, the term of this patent is extended or adjusted under 35 U.S.C. 154(b) by 963 days.

(21) Appl. No.: 11/798,694

(22) Filed: May 16, 2007

(65) Prior Publication Data
US 2008/0283470 A1    Nov. 20, 2008

(51) Int. Cl.
C02F 1/24 (2006.01)
C02F 1/52 (2006.01)
C02F 1/56 (2006.01)
C02F 1/62 (2006.01)
C02F 9/02 (2006.01)
C02F 9/04 (2006.01)
C02F 9/08 (2006.01)

(52) U.S. Cl. ........ 210/703; 210/665; 210/666; 210/669; 210/685; 210/705; 210/729; 210/806; 210/807; 210/202; 210/266

(58) Field of Classification Search .......... 210/665, 210/666, 669, 685, 703, 705, 729, 806, 807, 210/202, 266
See application file for complete search history.

(56) References Cited

U.S. PATENT DOCUMENTS

| | | | |
|---|---|---|---|
| 3,736,253 A | 5/1973 | De Angelis et al. | |
| 3,740,331 A | 6/1973 | Anderson et al. | |
| 3,749,761 A | 7/1973 | Dean et al. | |
| 4,147,626 A | 4/1979 | Findlay et al. | |
| 4,252,643 A * | 2/1981 | Knettig et al. | 210/662 |
| 4,305,827 A * | 12/1981 | Sasaki | 210/688 |
| 4,374,029 A * | 2/1983 | Jaisinghani | 210/671 |
| 4,814,091 A | 3/1989 | Napier et al. | |
| 4,950,408 A | 8/1990 | Duisters et al. | |
| 5,545,330 A * | 8/1996 | Ehrlich | 210/703 |
| 5,599,515 A | 2/1997 | Misra et al. | |
| 5,667,694 A | 9/1997 | Cody et al. | |
| 5,871,648 A | 2/1999 | Allen et al. | |
| 5,904,853 A | 5/1999 | Allen et al. | |
| 6,071,413 A * | 6/2000 | Dyke | 210/651 |

(Continued)

FOREIGN PATENT DOCUMENTS
EP    0765842 A1    4/1997

(Continued)

OTHER PUBLICATIONS

Darrell L. Gallup et al., "Removal of Mercury and Arsenic from Produced Water", (2006).

(Continued)

Primary Examiner — Thomas M Lithgow
(74) Attorney, Agent, or Firm — Glenn T. Barrett; Malcolm D. Keen

(57) ABSTRACT

A method for removing ionic, organic and elemental mercury from aqueous streams such as wastewater streams from hydrocarbon processing. The method comprises four primary removal steps. First, a mercury precipitant is added to the stream to convert dissolved ionic species of mercury water-insoluble form. The majority of these precipitated solids, as well as other forms of particulate mercury, are subsequently removed by means of gas flotation. Following the flotation step, additional particulate and precipitated ionic mercury removal is accomplished with media filtration and finally, activated carbon acts to remove the remaining dissolved ionic mercury species as well as elemental and organic forms of mercury.

20 Claims, 1 Drawing Sheet

U.S. PATENT DOCUMENTS

Figure 1:
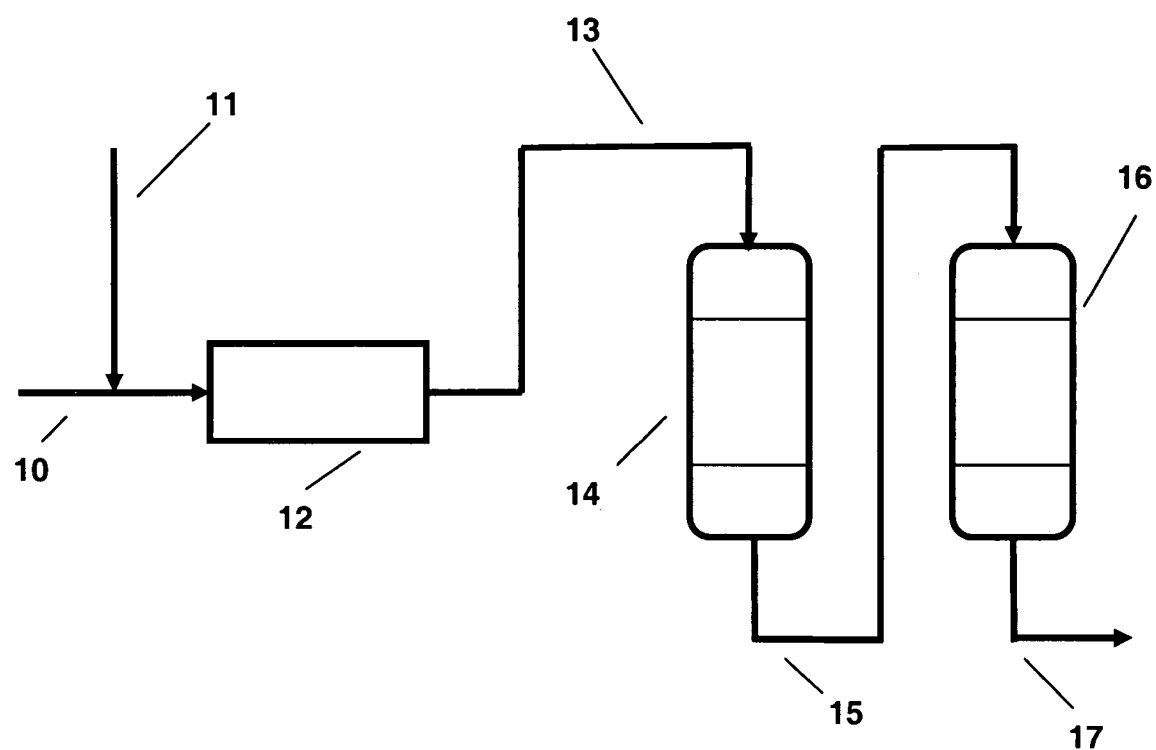

| | | | |
|---|---|---|---|
| 6,117,333 A * | 9/2000 | Frankiewicz et al. ......... 210/705 |
| 6,165,366 A | 12/2000 | Sarangapani | |
| 6,537,443 B1 | 3/2003 | Frankiewicz et al. | |
| 6,635,182 B1 | 10/2003 | Coleman, Jr. | |
| 7,029,202 B2 | 4/2006 | Zhuang | |
| 2002/0003112 A1 | 1/2002 | Golden | |
| 2003/0082084 A1 | 5/2003 | Cort | |
| 2004/0055962 A1 | 3/2004 | Golden | |
| 2004/0179984 A1 | 9/2004 | Nagaraj et al. | |

FOREIGN PATENT DOCUMENTS

| WO | WO 9107354 | 5/1991 |
|---|---|---|

OTHER PUBLICATIONS

EPA Capsule Report, "Aqueous Mercury Treatment", EPA/625/R-97/004 (Jul. 1997).

International Seasrch Report, PCT/US2008/006066, mailed Sep. 10, 2008.

Written Opinion, PCT/US2008/006066, mailed Sep. 10, 2008.

Singapore Appl. No. 200907584-7, Search Report from the IP Office of Singapore, dated Mar. 3, 2011, 5 pgs.

Singapore Appl. No. 200907584-7, Written Opinion from the IP Office of Singapore, dated Mar. 3, 2011, 4 pgs.

* cited by examiner

WASTEWATER MERCURY REMOVAL PROCESS

FIELD OF THE INVENTION

This invention relates to methods for removing mercury from wastewater streams and, in particular, to methods for removing mercury from wastewater streams from petroleum refineries and other petroleum processing installations.

BACKGROUND OF THE INVENTION

Natural gas and crude oils produced in certain areas of the world contain mercury in quantities sufficient to render their processing problematical. For example, hydrocarbon condensates derived from natural gas produced in certain regions of southeast Asia may contain over 1000 parts per billion by weight (ppbw) of mercury, while crude oils from certain regions of Argentina frequently contain well over 2000 ppbw of mercury. The produced waters from gas and oil wells with elevated levels of mercury may also contain high levels of mercury precluding their discharge to the environment as the direct result of contact between the water and the oil or gas in the subterranean production interval. Wastewater streams associated with processing the gas and oil may also contain mercury arising from contact between process water streams and hydrocarbon streams. The contact may take place, for example, by the use of water or aqueous treatment streams to remove other contaminants such as nitrogenous compounds.

The mercury may be present in several forms including ionic, elemental, particulate and organic. Crude oils, for example, may contain elemental mercury but this may be oxidized in various process units to produce water-soluble salts ($Hg^+$, $Hg^{2+}$) and complexes. Additionally, anaerobic bacteria can convert suspended mercury in particulate forms to water-soluble organic forms so that transfer between the two solvent species occurs readily.

The presence of the mercury raises problems of two kinds. First, the mercury may attack the metals in processing equipment by the formation of amalgams; this is a problem which is especially notable with items made of aluminum and aluminum alloys, such as the cold boxes in cryogenic plants such as the ethylene separators found in petrochemical units and in natural gas treatment installations. The presence of mercury on the equipment may also dictate its treatment as hazardous waste when removed from service. Mercury poisoning may also reduce the life of processing catalysts.

Second, mercury, as an elemental impurity that cannot be destroyed but only moved from one stream to another, will often enter process water streams. This may occur by direct contact with the stream, for example, during washing or from the use of process steam. Recent studies have shown that as much as 20% of the mercury in the crude can enter a refinery wastewater stream. In any event, increasingly stringent environmental regulations make it necessary to remove the mercury from the water before it can be discharged to the environment. Recent environmental limits may place the discharge target as low as 0.1 ppbw. The difficulty in dealing with mercury-containing crudes and other petroleum streams is exacerbated by the fact that increasingly, shortages of high quality crudes have led to the use of supplies of crude containing high levels of mercury.

Currently, few technologies are available for removing mercury from streams of wastewater and produced water. The main commercial technology available for treating mercury in water consists of adding one of several commercially-available precipitants, usually sulfided polymers, to precipitate dissolved ionic mercury and remove it by means of gas or air flotation. A technique of this kind is described in U.S. Pat. No. 6,635,182 (Coleman). Although this method is effective at removing the bulk of mercury found in wastewater (ionic species as $Hg^{2+}$), it cannot remove all mercury species which may be present, including insoluble particulate mercury compounds, elemental mercury (Hg(0)), present either as such or dissolved in minor amounts in the water, and organic mercury, principally monomethyl and dimethyl mercury. Where significant amounts of mercury or numerous different species are present and effluent limits are low, existing technologies are not likely to remove the amounts of mercury necessary to achieve environmental compliance.

Other proposals for treating aqueous streams to remove mercury and other heavy metals are found in U.S. Pat. No. 4,814,091 (Napier), U.S. Pat. No. 5,667,694 (Cody), U.S. Pat. No. 6,165,366 (Sarangapani) and U.S. Pat. No. 7,092,202 (Zhuang). Prefiltration followed by pH adjustment and sulfide precipitation followed by flocculation and posifiltration is used in the method of U.S. Pat. No. 4,814,091. The method described in U.S. Pat. No. 5,667,694 uses an organoclay sorbent which can then be separated from the water, containing the removed metal. A treatment better adapted to continuous use is described in U.S. Pat. No. 6,165,366, which uses sequential hypochlorite oxidation, filtration and removal of organics using activated carbon. In the method described in U.S. Pat. No. 7,029,202, a lignin derivative is used initially to form a complex compound with the mercury or other metal after which a coagulant is used to form a floc which is then separated as a sludge. These methods have, however, not shown themselves to be sufficient to remove mercury in many wastewater stream to the levels needed for regulatory compliance.

SUMMARY OF THE INVENTION

We have now devised a processing technique for removing mercury from aqueous streams (e.g., wastewater, produced water, process streams) which is effective to remove this metal regardless of the form in which it is present, be it ionic, elemental, particulate or organic, with the objective of achieving an effective removal of the mercury contaminant to levels acceptable for discharge to the environment.

The processing according to an embodiment of the invention comprises four primary removal steps. First, a mercury precipitant, which targets dissolved ionic species of mercury and converts them to water-insoluble form is added to the aqueous stream. The majority of these precipitated solids, as well as some particulate mercury and hydrocarbon contaminants, are then subsequently removed by means of flotation, usually operated as dissolved air, induced air, or induced gas flotation. Following the removal of the precipitated solids, additional particulate and precipitated ionic mercury removal is accomplished by filtration, suitably with a media filter. Finally, activated carbon acts as a polishing step to remove the remaining dissolved ionic mercury species as well as elemental and organic forms of mercury. This combination of processing steps is capable of achieving levels of mercury removal from water that have not previously been thought possible.

The method for removing mercury in ionic and non-ionic form from an aqueous stream in accordance with one aspect of the present invention includes adding a water-soluble mercury precipitant to the aqueous stream to react with dissolved mercury compounds present in the stream to form a water-insoluble precipitate of a mercury compound. Non-ionic forms of mercury which may also be present in the aqueous stream may include organic mercury compounds and/or elemental mercury. The water-insoluble precipitate of the mercury compound is then separated from the aqueous stream by means of flotation along with hydrocarbons which may be present. The separated aqueous solution is then passed through a filter to remove residual precipitated mercury compounds and form a filtrate of water with a reduced level of mercury, The filtrate is then passed over activated carbon to remove residual dissolved ionic mercury species as well as elemental and organic forms of mercury.

The mercury precipitate may comprise a compound which reacts with the dissolved mercury compounds present in the stream to form water-insoluble sulfides of mercury. The mercury precipitant may suitably comprise an alkali metal sulfide, an alkali metal polysulfide, an alkaline earth metal sulfide, an alkaline earth metal polysulfide. Other mercury precipitants include thiazoles, alkali metal thiocarbamates, alkali metal dithiocarbamates, alkali metal xanthates and alkali metal trithiocarbonates. A preferred class of water-soluble mercury precipitants are the polymeric dithiocarbamates.

The media filter may comprise a dual media filter, e.g. a sand-anthracite.

DRAWINGS

FIG. 1 is a process schematic for a mercury removal process in accordance with an embodiment of the present invention.

DETAILED DESCRIPTION

The following preferred embodiments of the invention are described by way of illustration. All stated proportions and percentages are by weight unless indicated to the contrary.

As shown in the FIG. 1, the mercury-containing aqueous stream enters a treatment unit for processing according to the present invention by way of line 10 where it meets an injected aqueous stream of water-soluble mercury precipitant entering from line 11. Upon mixing of the two streams, which typically takes place readily in the flow lines, a reaction occurs to precipitate dissolved ionic mercury out of solution. The stream then passes into a flotation tank 12 in which the precipitated solids are separated by flotation in the conventional manner. The liquid from the floatation tank then passes through line 13 to filter 14 in which residual precipitated ionic mercury particles are removed. The resulting filtrate then passes through line 15 to vessel 16 for an activated carbon polishing step in which remaining dissolved ionic mercury together with elemental and organic mercury are removed along with residual hydrocarbons. The water, essentially free of all mercury species then leaves the treatment unit through line 17 and can be followed by other treatment steps which may be necessary or desirable, for example, biotreatment to reduce chemical oxygen demand or, if the stream is by now in compliance with applicable regulations, discharged to the environment.

The present mercury removal process is applicable to aqueous streams which contain mercury, including wastewater and produced water streams. As noted above, such aqueous streams are frequently associated with the production and refining of mercury-containing hydrocarbons and with production of petrochemical streams made from such hydrocarbons. The aqueous streams may be encountered close to the zone of production or, conversely, may be encountered at distant processing sites if the hydrocarbons have not been treated to remove the mercury before shipping. The present process has been proven to be effective at treating streams which contain levels of mercury up to 60,000 ng/l (nanograms per liter, equal to 60 ppb) through testing; however, it is anticipated that treating streams having as high as ppm levels of mercury is feasible.

In accordance with the mercury removal process, the aqueous stream containing the mercury species is subjected to an initial precipitation step to convert soluble mercury compounds in ionic form to an insoluble condition so that the compounds may be subsequently removed by physical means. To this end, a mercury precipitant, that is, a compound which will react with dissolved mercury cations, usually $Hg^{2+}$, is brought into contact with the aqueous stream in this step of the process. Contact may be achieved by simply adding a solution of the precipitant to the aqueous stream and mixing to ensure adequate contact throughout the body of the water. While the mixing of the mercury precipitant with the water stream may be accomplished by means such as, for example, coagulant-type mix tanks, towers with contact trays, countercurrent contactors or other devices intended to break up the added precipitant solution and distribute it uniformly throughout the mercury-containing water stream, these will generally not be necessary since the reaction between the precipitant and the dissolved mercury species takes place quickly. Normally, it suffices to add a solution of the precipitant to the aqueous flow stream at normal flow rates, ensuring, however, that good mixing is achieved in order to permit the reaction between the precipitant and the dissolved ionic mercury to take place. This may be achieved in an area of high turbulence, such as the suction side of a pump. If, however, a sump is present at the inlet of the flotation tank for mixing in coagulants or floculents, this can conveniently be used as a location for injection of the precipitant with good mixing assured prior to the flotation step. When coagulants or flocculants are added in conjunction with a mercury precipitant care must be taken to ensure compatibility. For example, if an anionic precipitant and cationic coagulant are used in conjunction, at least 30 seconds of mixing should be provided between injection points to avoid adverse interactions between the products. The mercury precipitant is preferably used in the form of a solution so as to permit easy and effective mixing with the aqueous stream.

One class of mercury precipitating agents comprises sulfides which react with the dissolved mercury ions to form insoluble mercury sulfide precipitates. A preferred class of sulfide precipitants comprises the water-soluble sulfides such as hydrogen sulfide, alkali metal sulfides such as sodium sulfide and the alkali metal polysulfides, alkaline earth metal sulfides, alkaline earth metal polysulfides, which are both economic and commercially available. Other materials which may be used to precipitate the mercury in sulfide form include the thiazoles, alkali metal thiocarbamates, alkali metal dithiocarbamates, alkali metal xanthates and alkali metal trithiocarbonates such as sodium trithiocarbonate ($Na_2CS_3$). The appropriate amount of the precipitant may be empirically determined.

To satisfy the need for a metal scavenging agent that is less toxic and also forms a large, fast settling floc, highly efficient metal chelating polymers have become commercially available and these are useful as mercury precipitants in the present process. Water soluble polymers of this type include the polydithiocarbamates which may be used effectively in the present process with a reduced risk of discharge of either the mercury itself or of a toxic treating agent. Polymers of this type are described, for example, in U.S. Pat. Nos. 5,500,133; 5,523,002; 5,658,487; 5,164,095; and 5,510,040 and are currently marketed by Betz-Dearborn Inc. and Nalco Inc., under the respective trade names of METCLEAR™ 2405 and NAL-MET™. Precipitants of this type are preferred for use in the present process in view of their ability to produce a flocculent precipitate which can be readily separated in the subsequent gas flotation step although, again, coagulants and floculents may be added. In streams containing up to 60 ppb mercury, the use of the water-soluble polymeric dithiocarbamates in amounts up to 30 ppm has been found adequate for substantial mercury removal but in all cases, the necessary amount relative to the level of ionic mercury contaminant should be determined empirically or by reference to supplier directions.

The mercury precipitants are normally used at near-neutral or slightly alkaline conditions, with values close to 8 being typical, although lower and higher pH values can be tolerated. The molar amount of the selected precipitant should at least equal the amount of mercury ions to be removed with a slight excess preferably being present. The use of large excesses of precipitants such as sodium sulfide should, however, be avoided as they may lead to the formation of water-soluble mercury sulfide complexes which inhibit removal of mercury by the present process. Additionally, excessive amounts of sulfides and other precipitants of this type could exceed the amounts permitted in water discharges and since certain of these precipitants may be toxic in themselves, care must be taken to ensure that they are not present in the discharged wastewater. Another reason for not using excessive amounts of precipitant is that residual amounts will tend to be adsorbed upon the carbon and will load up the carbon bed prematurely. The optimal amount of precipitant should, for this reason, not exceed the mercury content by more than one order of magnitude. Temperatures during the precipitation step can suitably range from 10°-40° C. (about 50°-100° F.) although temperatures outside this range are not to be excluded. The average residence time in the precipitation step should be long enough to enable the reaction to take place through the body of liquid and for the precipitate to form fully. Normally from 10 to 20 minutes will be adequate and sufficient.

The metal complex precipitates formed by reaction of the mercury with precipitants such as the sulfides, polysulfides, mercaptans, thiocarbonates, thiocarbamates and xanthates are usually in the form of fine solids which do not settle or filter easily and for this reason, are susceptible to clogging and may even pass through most filtration systems. Addition of a coagulant or flocculating agent is normally preferable to achieve efficient removal of these suspended solids in the subsequent gas flotation step, even when using the preferred polymeric dithiocarbamate precipitants. Additionally, coagulant or flocculating agents may be required in services with high levels of influent free hydrocarbon and/or suspended solids to help remove these contaminants and avoid adverse interactions with the mercury precipitant. Suitable coagulants and flocculants are organic or inorganic, or a combination of the two, and may be polymeric, either anionic or cationic and usually can be categorized as polyelectrolytes such as sodium aluminate, aluminum trihydrate, and ferric chloride. Polymeric organic coagulants and flocculants include the polyacrylamides, diallyldimethylammonium chloride (DADMAC) polymers, DADMAC-polyacrylamides and epichlorohydrin dimethylamine (EPI-DMA) polyamines. If used, these materials may be added in the conventional amounts. These coagulants and flocculants are typically added to streams prior to treatment by flotation; they may continue to be used in the present process to promote separation of the precipitated mercury compounds. The amount of coagulant or flocculant is generally in line with existing practices for removing suspended solids since the amount of precipitated mercury compound is not great. Typically, up to about 50 ppm is used, depending on the nature of the coagulant or flocculant and in most cases, less than 25 ppm will be sufficient, e.g. 10 ppm.

Following the addition of the precipitant and any coagulating or flocculating agent, the aqueous stream and the precipitate of the insoluble mercury compound are transmitted to the flotation tank 12 where the majority of the precipitate is removed by flotation (which includes and normally, is, dissolved air, induced air, or induced gas flotation). Flotation techniques and equipment are well known. An example of a gas flotation unit similar to those which may be used as a part of the present process is found in U.S. Pat. No. 6,635,182. Using flotation, the precipitated mercury compounds are concentrated into a sludge which can be removed from the water phase and sent for disposal according to conventional solids treatment methods. The flotation step therefore acts to concentrate the mercury content of the aqueous stream, along with other metals removed in the precipitation/flotation, including lead, cadmium, nickel and copper. The flotation step may also remove hydrocarbons which may be present in the water; normally, hydrocarbons present will be carried off in the float which is carried up to the surface of the water by the action of the as bubbles. If volatile hydrocarbons are likely to be present, a closed flotation tank should be used.

Additional removal of particulate mercury, too small to be removed by flotation, is then conducted by media filtration following the flotation. To this end, the processed aqueous stream is removed from flotation tank 12 via line 13 to the filtration unit 14. The filtration process can be carried out using filters appropriate to the volume of water passing through the unit and to the need to remove very finely-divided particles of mercury from the water. Although the use of mechanical filters and membrane microfilters may be contemplated, media filters will normally be preferred. Media filtration is carried out using a bed of finely-divided, inert solid such as sand or anthracite which retains particulate mercury and any residual precipitate not removed by flotation. The bed particle size should be chosen in accordance with the floc size achieved in the precipitation/flotation step. Normally, the media filter will have the largest particle size medium on top of the bed with progressively decreasing particle size down through the bed The downflow dual media filter is the preferred type in view of its ability to process large quantities of water although other types of filter may also be used. Backwash capabilities should preferably be incorporated. A dual media filter with sand on bottom (particle size 0.4-0.6 mm) and anthracite on top (particle size 0.85-0.95 mm) is particularly preferred although media particle sizes of this magnitude will be suitable with other media filters. Flux rates of up to about 3 $l/m^2/min$ (about 9 $gal/ft^2/min$) are suitable for use in a dual media filter in the present process and similar rates would be typical of other media.

The filtered aqueous stream is again filtered through a bed of activated carbon to remove any residual dissolved ionic mercury species as well as elemental and organic forms of mercury. Carbon has been found effective for removing potential trace species (elemental as well as organic) as well as to act as a final guard bed for particulate matter. A notable feature of the present technique is that the carbon is more selective for mercury than for dissolved organics or chemical oxygen demand (COD) with the result that the bed remains active for mercury removal even after the ability to remove organics has dissipated, as shown by an increase in the COD of the activated carbon filtrate.

The type of carbon most preferred in this step is granular activated carbon with an average particle size from 0.8 to 1.0 mm although particle sizes both above and below this range may be found suitable. A preferred type of carbon is standard bituminous coal based activated carbon. Carbons of this kind are widely available commercially from suppliers such as Calgon Carbon Corporation, Pittsburgh Pa., Fresh Water Systems, Greenville S.C. and Res-Kem Corp Media, Pa. Flow rates over the granular carbon beds using a downflow regime can typically be 1 to 2 $l/m^2/min$ (about 3-5 $gal/ft^2/min$). A minimum of two activated carbon columns in series is preferred with operation in a lead/polish configuration. In this configuration, lead bed breakthrough can be tolerated, allowing the lead bed to stay on-line longer and become more heavily loaded. The polish bed removes any residual mercury allowing for mercury-free effluent. After the lead bed is spent, it is replaced with fresh carbon and then becomes the polish bed. The use of powder activated carbon (PAC) in a slurry contact reactor with the PAC removed in a subsequent solids separation stage would be less preferred both in terms of cost and the ability to remove particulates without the additional solids separation stage. Another option would be PAC addition to an existing activated sludge biological treatment unit.

Pilot tests were conducted to confirm the effectiveness of the mercury precipitant and media filter on the removal of mercury on wastewater from a petroleum refinery by spiking the effluent from the IAF (Induced Air Floatation) unit with mercury to simulate the wastewater expected when running high mercury crude. The test wastewater was spiked in the testing with 30 wppb ionic mercury (mercury chloride) and treated with various amounts of the mercury precipitant, GE Betz MetClear (MR 2405), before being passed to a settling tank to permit some removal of the precipitated solids. In some tests a cationic coagulant, GE Betz Klaraid (CDP 1337), was added to minimize interaction between free-hydrocarbon/suspended solids and MetClear as well as improve settling of the pin floc produced. The effluent from the settling tank was then filtered through a media filter comprising sand and anthracite. Mercury levels were measured before the precipitant addition and before and after the media filter. The six week test confirmed that at optimal chemical dosing rates, 96% mercury removal could be achieved using the mercury precipitant. With the addition of the media filter, over 99% removal of dissolved ionic mercury was achieved with all levels in the treated wastewater being below the detection limit of 0.1 wppb. The addition of the air flotation step could be expected to improve filter operation (increase filter run length) by superior removal of the precipitated solids prior to entry to the filter bed.

The results are shown in Table 1 below.

TABLE 1

Removal of Ionic Mercury (30 ppb) by Precipitation, Filtration

| MetClear ppm | Flocculant ppm | Hg before DMF, ppb | Hg after DMF, ppb | Removal: MetClear | Removal: DMF | Removal: MetClear + DMF |
|---|---|---|---|---|---|---|
| 15 | 0 | 4 | | 86.7% | | |
| 15 | 0 | 0.4 | 0.1 | 98.7% | 75.0% | 99.7% |
| 15 | 0 | 0.6 | | 98.0% | | |
| 15 | 0 | 0.6 | 0.2 | 98.0% | 66.7% | 99.3% |
| 15 | 0 | 0.7 | | 97.7% | | |
| 15 | 0 | 1.1 | | 96.3% | | |
| 15 | 0 | 1.6 | 0.2 | 94.7% | 87.5% | 99.3% |
| 15 | 0 | 0.4 | | 98.7% | | |
| 15 | 0 | 0.1 | 0.1 | 99.7% | 0.0% | 99.7% |
| 15 | 0 | 0.1 | 0.1 | 99.7% | 0.0% | 99.7% |
| 15 | 0 | 0.3 | 0.2 | 99.0% | 33.3% | 99.3% |
| 15 | 0 | 0.6 | 0.9 | 98.0% | 50.0% | 97.0% |
| 15 | 0 | | 1.1 | | | 96.3% |
| 15 | 0 | 0.2 | 0.1 | 99.3% | 50.0% | 99.7% |
| 15 | 0 | 0.1 | 0.1 | 99.7% | 0.0% | 99.7% |
| 15 | 0 | 0.4 | 0.1 | 98.7% | 75.0% | 99.7% |
| 15 | 0 | 0.5 | 0.5 | 98.3% | 0.0% | 98.3% |
| 25 | 0 | 0.2 | 0.1 | 99.3% | 50.0% | 99.7% |
| 25 | 0 | 12.8 | 1.4 | 57.3% | 89.1% | 95.3% |
| 25 | 0 | 2.3 | | 92.3% | | |
| 25 | 0 | 2.9 | | 90.3% | | |
| 25 | 0 | 3.2 | 2.4 | 89.3% | 25.0% | 92.0% |
| 25 | 0 | 2.3 | | 92.3% | | |
| 25 | 0 | 2.6 | | 91.3% | | |
| 25 | 0 | 2.6 | 3.0 | 91.3% | 15.4% | 90.0% |
| 25 | 0 | 5.4 | 1.7 | 82.0% | 68.5% | 94.3% |
| 30 | 0 | 6.2 | 3.6 | 79.3% | 41.9% | 88.0% |
| 30 | 0 | 4.7 | 2.2 | 84.3% | 53.2% | 92.7% |
| 30 | 0 | 3.3 | 0.6 | 89.0% | 81.8% | 98.0% |
| 30 | 0 | 1.6 | 0.2 | 94.7% | 87.5% | 99.3% |
| 30 | 10 | 0.1 | 0.1 | 99.7% | 0.0% | 99.7% |
| 30 | 10 | 0.3 | 0.1 | 99.0% | 66.7% | 99.7% |
| 30 | 10 | 0.2 | 0.5 | 99.3% | 150.0% | 98.3% |
| 30 | 10 | 0.1 | 0.2 | 99.7% | 100.0% | 99.3% |
| 30 | 10 | 0.7 | 0.1 | 97.7% | 85.7% | 99.7% |
| 30 | 10 | 0.5 | 0.1 | 98.3% | 80.0% | 99.7% |
| 30 | 10 | 1.2 | 0.1 | 96.0% | 91.7% | 99.7% |
| 30 | 10 | 0.4 | 0.1 | 98.7% | 75.0% | 99.7% |
| 30 | 10 | 0.1 | 0.1 | 99.7% | 0.0% | 99.7% |
| 15 | 10 | 1.6 | 0.1 | 94.7% | 93.8% | 99.7% |
| 15 | 10 | 1.6 | 0.1 | 94.7% | 93.8% | 99.7% |
| 15 | 10 | 0.5 | 0.1 | 98.3% | 80.0% | 99.7% |
| 15 | 10 | 0.5 | 0.1 | 98.3% | 80.0% | 99.7% |

The use of activated carbon is an effective guard for organic mercury was also confirmed by pilot plant testing. In the tests, the IAF wastewater was spiked with organic mercury (as mercury alkyl dithiocarbamate) at 30 ppb and 60 ppb to simulate the expected aqueous stream composition associated with high mercury content crude and gases. The spiked wastewater was processed through a dual media filtration unit of sand and anthracite as above followed by a single activated carbon column. Mercury levels were measured before passing through the media filter, before passing through the carbon column, and after the carbon column. Additionally, chemical oxygen demand (COD) levels were also measured to determine whether COD or mercury would be selectively adsorbed. It was discovered that complete mercury removal was maintained even after COD breakthrough (breakthrough of dissolved organic compounds). In this seven week test, outlet mercury levels of less than 0.1 wppb (detection limit) were consistently achieved and the carbon life was proven to be sufficient for commercial operation.

The results of testing using 30 ppb of added organic mercury are given in Table 2 below.

TABLE 2

Organic Hg (30 ppb) Removal over Dual Media Filter, Carbon

| Run No. | Hg before DMF, ppb | Hg after DMF, ppb | Hg after Carbon, ppb | Removal: DMF | Removal: Carbon | Total Removal |
|---|---|---|---|---|---|---|
| 1 | 5.1 | 0.9 | 0.1 | 82.40% | 88.90% | 98.00% |
| 2 | 1.2 | 0.09 | 0.1 | 92.50% | −11.10% | 91.70% |
| 3 | 0.1 | 0.1 | 0.1 | 0.00% | 0.00% | 0.00% |
| 4 | 0.4125 | 0.1 | 0.1 | 75.80% | 0.00% | 75.80% |
| 5 | 0.1625 | 0.1 | 0.1 | 38.50% | 0.00% | 38.50% |
| 6 | 0.3625 | 0.1 | 0.1 | 72.40% | 0.00% | 72.40% |
| 7 | 1.35 | 0.1 | 0.1 | 92.60% | 0.00% | 92.60% |
| 8 | 1.065 | 0.3625 | 0.1 | 66.00% | 72.40% | 90.60% |
| 9 | 1 | 0.0875 | 0.1 | 91.30% | −14.30% | 90.00% |
| 10 | 1.4 | 0.5 | 0.1 | 64.30% | 80.00% | 92.90% |
| 11 | 1.5 | 0.4 | 0.1 | 73.30% | 75.00% | 93.30% |
| 12 | 0.7 | 0.3 | 0.1 | 57.10% | 66.70% | 85.70% |
| 13 | 0.1 | 0.1 | 0.1 | 0.00% | 0.00% | 0.00% |
| 14 | 0.8 | 0.1 | 0.1 | 87.50% | 0.00% | 87.50% |
| 15 | 0.2 | 0.1 | 0.1 | 50.00% | 0.00% | 50.00% |
| 16 | 0.1 | 0.3 | 0.1 | −200.00% | 66.70% | 0.00% |

The results obtained with the addition of 60 ppb organic mercury are shown in Table 3 below.

TABLE 3

Organic Hg (60 ppb) Removal over Dual Media Filter, Carbon

| Run No. | Hg before DMF, ppb | Hg after DMF, ppb | Hg after Carbon, ppb | Removal: DMF | Removal: Carbon | Total Removal |
|---|---|---|---|---|---|---|
| 17 | 0.5 | 0.4 | 0.1 | 20.00% | 75.00% | 80.00% |
| 18 | 0.5 | 0.3 | 0.1 | 40.00% | 66.70% | 80.00% |
| 19 | 1.3 | 0.1 | 0.1 | 92.30% | 0.00% | 92.30% |
| 20 | 0.1 | 0.1 | 0.1 | 0.00% | 0.00% | 0.00% |
| 21 | 1.2 | 0.1 | 0.1 | 91.70% | 0.00% | 91.70% |
| 22 | 1 | 0.2 | 0.1 | 80.00% | 50.00% | 90.00% |
| 23 | 0.7 | 0.6 | 0.3 | 14.30% | 50.00% | 57.10% |
| 24 | 0.6 | 0.7 | 0.2 | −16.70% | 71.40% | 66.70% |
| 25 | 0.3 | 0.8 | 0.4 | −166.70% | 50.00% | −33.30% |
| 26 | 0.3 | 0.4 | 0.3 | −33.30% | 25.00% | 0.00% |
| 27 | 0.2 | | 0.2 | | 0.00% | 0.00% |
| 28 | 0.4 | | 0.2 | | 50.00% | 50.00% |

The selectivity of the carbon for mercury removal in preference to the removal of organics creating chemical oxygen demand (COD) is shown in Table 4 below, obtained in certain of the runs identified in Table 3 above. The results show that COD is not reduced to the same extent as the organic mercury, indicating that there is a selectivity for mercury removal.

TABLE 4

COD Effluent from Carbon Column

| Run No. | COD before DMF, mg/l | COD after Carbon, mg/l | % COD Reduction |
|---|---|---|---|
| 17 | 387 | 194 | 50% |
| 18 | 346 | 205 | 41% |
| 19 | 267 | 159 | 40% |
| 20 | 351 | 190 | 46% |
| 21 | 174 | 243 | −40% |
| 23 | 275 | 192 | 30% |
| 24 | 214 | 197 | 8% |
| 25 | 276 | 215 | 22% |

Isotherm tests were conducted using dissolved ionic mercury (mercury chloride), organic mercury (diethylmercury), and elemental mercury to confirm the effectiveness on different forms of mercury. The tests confirmed that carbon was shown to have the ability to remove each of the dissolved forms of mercury, although the carbon capacities differ depending on the species.

The invention claimed is:

1. A method for removing mercury in ionic and non-ionic form from aqueous streams, comprising:
   (i) adding a mercury precipitant to the aqueous stream to react with dissolved ionic mercury compounds present in the stream to form a water-insoluble precipitate of a mercury compound,
   (ii) separating the precipitated mercury compounds from the water of the stream by means of gas flotation,
   (iii) passing the water separated from the stream through a media filter to remove particulate mercury and residual particulate material and so form a filtrate of water with a reduced level of mercury,
   (iv) passing the filtrate over activated carbon to remove residual mercury.

2. A method according to claim 1 in which the non-ionic forms of mercury present in the aqueous stream comprise organic mercury compounds.

3. A method according to claim 1 in which the non-ionic forms of mercury present in the aqueous stream comprise elemental mercury.

4. A method according to claim 1 in which the mercury precipitant comprises a compound which reacts with the dissolved mercury compounds present in the stream to form water-insoluble sulfides of mercury.

5. A method according to claim 4 in which the mercury precipitant comprises an alkali metal sulfide, an alkali metal polysulfide, an alkaline earth metal sulfide, an alkaline earth metal polysulfide.

6. A method according to claim 1 in which the mercury precipitant comprises a thiazole, an alkali metal thiocarbamate, an alkali metal dithiocarbamate, an alkali metal xanthate or an alkali metal trithiocarbonate compound which reacts with the dissolved mercury compounds present in the stream to form a water-insoluble compound of mercury.

7. A method according to claim 1 in which the mercury precipitant comprises a water-soluble polymeric dithiocarbamate which reacts with the dissolved mercury compounds present in the stream to form a water-insoluble compound of mercury.

8. A method according to claim 1 in which the pH is maintained in the range from about 6 to about 9 when the mercury precipitant is added to the aqueous stream.

9. A method according to claim 8 in which the temperature is maintained in the range from 10°-40° C. when the mercury precipitant is added to the aqueous stream.

10. A method according to claim 8 in which the a coagulant or flocculant is added to the stream when the precipitate is formed.

11. A method according to claim 10 in which the amount of coagulant of floculant is less than 25 ppm.

12. A method according to claim 7 in which the aqueous stream comprises mercury in an amount up to 60 ppbw and the amount of the added water-soluble polymeric dithiocarbamate is up to 50 ppmw.

13. A method according to claim 12 in which the amount of the added water-soluble polymeric dithiocarbamate is up to 30 ppmw.

14. A method according to claim 1 in which the media filter comprises a dual media filter.

15. A method according to claim 14 in which the dual media filter comprises a sand bed on an anthracite bed.

16. A method according to claim 15 in which the dual media filter comprises sand with a particle size of 0.4-0.6 mm sand on bottom and anthracite with a particle size of 0.85-0.95 mm on top of the sand.

17. A method according to claim 14 in which the flux rate through the filter is up to about 3 $l/m^2/min$.

18. A method according to claim 1 in which the activated carbon comprises granular activated carbon with an average particle size from 0.8 to 1.0 mm.

19. A method according to claim 18 in which the activated carbon comprises bituminous coal based activated carbon.

20. A method according to claim 18 in which the flow rates over the granular carbon is 1 to 2 $l/m^2/min$.

* * * * *